US012390916B2

(12) United States Patent
Song et al.

(10) Patent No.: US 12,390,916 B2
(45) Date of Patent: Aug. 19, 2025

(54) POWER TOOL AND CLUTCH ASSEMBLY THEREOF

(71) Applicant: JIANGSU DONGCHENG TOOLS TECHNOLOGY CO., LTD., Jiangsu (CN)

(72) Inventors: Juhui Song, Jiangsu (CN); Yichao Peng, Jiangsu (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 80 days.

(21) Appl. No.: 18/146,458

(22) Filed: Dec. 26, 2022

(65) Prior Publication Data

US 2023/0211487 A1 Jul. 6, 2023

Related U.S. Application Data

(63) Continuation of application No. PCT/CN2021/141991, filed on Dec. 28, 2021.

(30) Foreign Application Priority Data

Dec. 29, 2020 (CN) ......................... 202011601479.6

(51) Int. Cl.
*B25F 5/00* (2006.01)

(52) U.S. Cl.
CPC .................................... *B25F 5/001* (2013.01)

(58) Field of Classification Search
CPC ......... B25F 5/001; F16D 7/025; B25D 17/06; B25D 2217/0023; E02F 3/966;
(Continued)

(56) References Cited

U.S. PATENT DOCUMENTS 396,642 A * 1/1889 Ball ........................ F16D 7/025
464/47
1,604,242 A * 10/1926 Smedberg ............. A47J 43/044
366/288
(Continued)

FOREIGN PATENT DOCUMENTS

CA 2830328 A1 * 9/2012 ............ B23P 19/065
CN 1748953 A 3/2006
(Continued)

OTHER PUBLICATIONS

International Search Report of PCT Patent Application No. PCT/CN2021/141991 issued on Mar. 25, 2022.
(Continued)

*Primary Examiner* — Robert F Long

(57) ABSTRACT

Discloses are a power tool and a clutch assembly. The power tool includes a housing; a motor; and a transmission assembly, driven by the motor and including a clutch assembly. The clutch assembly includes an intermediate shaft, and an elastic member and a clutch block that are sleeved on the intermediate shaft. A front end of the elastic member is supported on the intermediate shaft, and a rear end of the elastic member is supported on the clutch block. The clutch block includes: a gear; a friction plate; and a nut. The gear rotates relative to the friction plate and the nut, in response to a driving force of the motor for driving the gear being greater than a sum of a friction force between the gear and the friction plate and a friction force between the gear and the nut.

11 Claims, 3 Drawing Sheets

(58) Field of Classification Search
CPC ..... E02F 9/2217; E02F 9/2225; E02F 9/2285; F15B 1/04; F15B 11/08; F15B 13/027; F15B 15/00
USPC ..... 173/1-2, 13, 18-20, 184, 29-31, 38-39, 173/45-53, 90, 25-31
See application file for complete search history.

(56) References Cited

U.S. PATENT DOCUMENTS 2,782,813 A * 2/1957 Dudek ...................... B27B 5/32 83/591
2,820,861 A * 1/1958 Manning ................ G04C 23/16 200/39 R
2,952,146 A * 9/1960 Bruck .................... B23D 47/12 464/10
2,956,578 A * 10/1960 Cyril ......................... F02K 3/00 251/324
3,181,566 A * 5/1965 Volkmann ............... B25C 1/043 137/625.69
3,375,758 A * 4/1968 Novak .................... B25C 1/041 91/461
3,427,928 A * 2/1969 Bade ....................... B25C 1/043 91/308
3,527,142 A * 9/1970 Obergfell ................ B25C 1/041 91/461
3,589,489 A 6/1971 Fehlings
3,730,481 A * 5/1973 Ekonen ................... B66F 3/247 254/93 R
3,741,527 A * 6/1973 Dahl ..................... F16D 43/218 254/350
4,068,544 A * 1/1978 Breeckner ........... B25B 27/0035 81/176.1
4,089,533 A * 5/1978 Knudson .............. F16J 15/3236 277/436
4,347,902 A * 9/1982 Wallace ................ B25B 21/026 173/93.5
4,499,813 A * 2/1985 Lampert ................. F15B 15/08 92/116
4,522,270 A * 6/1985 Kishi .................... B23B 45/001 74/543
4,910,443 A * 3/1990 Zylstra ...................... H02P 7/04 318/285
4,921,083 A * 5/1990 Etscheidt .................. H02P 7/04 192/56.6
5,322,136 A * 6/1994 Bui ........................... E21B 4/14 173/110
5,791,712 A * 8/1998 Hawn ..................... E21B 31/18 294/86.15
RE36,166 E * 3/1999 Johns ........................ E21B 4/16 173/17
6,196,332 B1 * 3/2001 Albert ..................... B25B 21/00 173/217
6,206,248 B1 * 3/2001 Popp .................... B67D 7/0227 277/467
8,209,830 B1 * 7/2012 Crespo ...................... B25F 3/00 30/500
9,314,855 B2 * 4/2016 Ookubo .................. H02P 23/03
9,431,874 B2 * 8/2016 Fukuda .................. G01D 11/10
2002/0108994 A1 * 8/2002 Burke ....................... B25C 1/06 227/81
2006/0061048 A1 * 3/2006 Puzio .................. B23B 31/1253 279/60
2009/0272782 A1 * 11/2009 Johnson .................. B25B 21/00 227/130
2011/0198381 A1 * 8/2011 McCardle ................. B25C 1/06 227/8
2011/0308096 A1 * 12/2011 Yu .......................... B27B 17/14 30/386
2012/0234305 A1 * 9/2012 Jonsson ................. B28D 1/045 125/15
2013/0221626 A1 * 8/2013 Lee ........................ B60G 17/08 280/5.514
2017/0001291 A1 * 1/2017 Schnell ..................... B25C 1/00
2020/0223048 A1 * 7/2020 Ruethers .............. B25D 11/005
2021/0114195 A1 * 4/2021 Yoshikane ............. B25D 11/10
2021/0146520 A1 * 5/2021 Heep .................... B25D 11/125
2023/0089438 A1 * 3/2023 Hatoum ............... B60Q 1/2657 248/550
2023/0313843 A1 * 10/2023 Kisaichi .................. F02N 11/10 74/405

FOREIGN PATENT DOCUMENTS

| | | | | | |
|---|---|---|---|---|---|
| CN | 2842064 | Y | | 11/2006 | |
| CN | 105443610 | A | * | 3/2016 | ........... F16D 43/215 |
| CN | 205734746 | U | | 11/2016 | |
| CN | 106678193 | A | * | 5/2017 | ............... B66D 1/58 |
| CN | 107420509 | A | | 12/2017 | |
| CN | 112576638 | A | | 3/2021 | |
| CN | 214560598 | U | * | 11/2021 | ............. B25D 16/00 |
| CN | 214578440 | U | * | 11/2021 | .............. B25F 5/001 |
| CN | 220816324 | U | * | 4/2024 | |
| DE | 3942806 | A1 | | 6/1991 | |
| DE | 4100185 | A1 | * | 7/1992 | |
| DE | 4009124 | C2 | * | 11/1993 | ............. B23Q 11/04 |
| DE | 102013226927 | A1 | * | 6/2015 | ........... F02N 15/023 |
| EP | 0604887 | A1 | | 7/1994 | |
| GB | 1262643 | A | * | 2/1972 | |
| GB | 1474653 | A | * | 5/1977 | ............. B23Q 11/04 |
| JP | 2003314582 | A | | 11/2003 | |
| WO | WO-02072210 | A1 | * | 9/2002 | ........... A63B 21/157 |
| WO | WO-2010061805 | A1 | * | 6/2010 | ............. F16D 13/76 |
| WO | WO-2011028154 | A1 | * | 3/2011 | ............. B23D 47/12 |

OTHER PUBLICATIONS

Agricultural development and equipment, Issue 05; May 28, 2013; Yang Kai; Handling and maintenance of tractor clutch faults; 1-9; pp. 77-78; Publication dated May 28, 2013 (6 pages).
Chinese First Office Action, Chinese Application No. 202011601479.6, mailed Sep. 28, 2024 (11 pages).

* cited by examiner

POWER TOOL AND CLUTCH ASSEMBLY THEREOF

CROSS REFERENCE

The present application is a continuation-application of International (PCT) Patent Application No. PCT/CN2021/141991, filed on Dec. 28, 2021, which claims priority of Chinese Patent Application No. 202011601479.6, filed on Dec. 29, 2020, the entire contents of which are hereby incorporated by reference in its entirety.

TECHNICAL FIELD

The present disclosure relates to the technical field of power tools, in particular to a power tool and a clutch assembly.

BACKGROUND

In order to prevent a motor from burning out when an output part of a conventional power tool is stuck by an external force, the power tool is usually equipped with a clutch assembly. In this way, when the output part is stuck and cannot rotate, the clutch assembly separates the output part from the motor.

Referring to Chinese Patent No. CN2842064Y, which discloses a clutch assembly. The clutch assembly includes a small bevel gear and a large plate gear, two friction plates, two stop gaskets, and an elastic washer sleeved on the small bevel gear. The two friction plates are respectively arranged on both sides of the large plate gear, each of the two friction plates is arranged with one stop gasket arranged on the outside thereof, and the elastic washer is arranged on the outside of the stop gasket below the large plate gear and is arranged with a nut at the outside of the elastic washer. The components of the whole clutch assembly are assembled from top to bottom, which leads to the length of the clutch assembly being great, increasing the volume of the power tool. In addition, after the clutch assembly has been used for a long time, the wear occurs between the friction plates and the large plate gear, and the pressure exerted by the elastic washer on the friction plate decreases. In this case, it is necessary to disassemble the housing of the power tool and take out the clutch assembly, and tighten the nut to the small bevel gear again so as to reach the pressure value exerted by the elastic washer on the friction plate before the wear of the large plate gear and the friction plate. However, the tightening operation of the nut is cumbersome and time-consuming.

Therefore, it is desired to provide a new power tool that solves the problems of the clutch assembly with excessive length and the requirement for continuously tightening the nut.

SUMMARY OF THE DISCLOSURE

The present disclosure provides a power tool and a clutch assembly.

In a first aspect, the present disclosure provides a power tool, including: a housing, extending along a front-to-rear direction; a motor, retained in the housing; and a transmission assembly, configured to be driven by the motor and including a clutch assembly disposed in the housing; wherein the clutch assembly includes an intermediate shaft extending along the front-to-rear direction, and an elastic member and a clutch block that are sleeved on the intermediate shaft; wherein a front end of the elastic member is supported on the intermediate shaft, and a rear end of the elastic member is supported on the clutch block; wherein the clutch block includes: a gear, configured to be driven by the motor; a friction plate, disposed between the elastic member and the gear; and a nut, threadedly connected to the intermediate shaft; wherein a rear end of the nut is supported on a rear side of the gear, and a front end of the nut passes through the gear and is clamped by the friction plate; the nut is configured to drive the friction plate to be compressed on the elastic member; the motor is configured to drive the gear to rotate together with the intermediate shaft; wherein the gear rotates relative to the friction plate and the nut, in response to a driving force of the motor for driving the gear being greater than a sum of a friction force between the gear and the friction plate and a friction force between the gear and the nut.

In a second aspect, the present disclosure provides a power tool, including: a housing, extending along a front-to-rear direction; a motor, retained in the housing and arranged with a motor shaft extending along the front-to-rear direction; and a transmission assembly, configured to be driven by the motor and including a clutch assembly disposed in the housing; wherein the clutch assembly includes an intermediate shaft extending along the front to rear direction, and an elastic member and a clutch block that are sleeved on the intermediate shaft; wherein both ends of the elastic member are supported on the intermediate shaft and the clutch block in the front-to-rear direction, respectively; wherein the clutch block includes: a gear, configured to be driven by the motor shaft; and a nut, threadedly connected to the intermediate shaft; wherein the nut compresses the gear against the elastic member so that the elastic member is clamped between the gear and intermediate shaft, and the motor is configured to drive the gear and the intermediate shaft to rotate together via the elastic member.

In a third aspect, the present disclosure provides a clutch assembly, including: an intermediate shaft; and an elastic member and a clutch block, sleeved on the intermediate shaft; wherein a front end of the elastic member is supported on the intermediate shaft, and a rear end of the elastic member is supported on the clutch block; wherein the clutch block includes: a gear, configured to be driven by a motor; a friction plate, disposed between the elastic member and the gear; and a nut, threadedly connected to the intermediate shaft; wherein a rear end of the nut is supported on a rear side of the gear, and a front end of the nut passes through the gear and is clamped by the friction plate; the nut is configured to drive the friction plate to be compressed on the elastic member; the gear is configured to, driven by the motor, rotate together with the intermediate shaft; wherein the gear rotates relative to the friction plate and the nut, in response to a driving force of the motor for driving the gear being greater than a sum of a friction force between the gear and the friction plate and a friction force between the gear and the nut.

DETAILED DESCRIPTION

Figure 1:
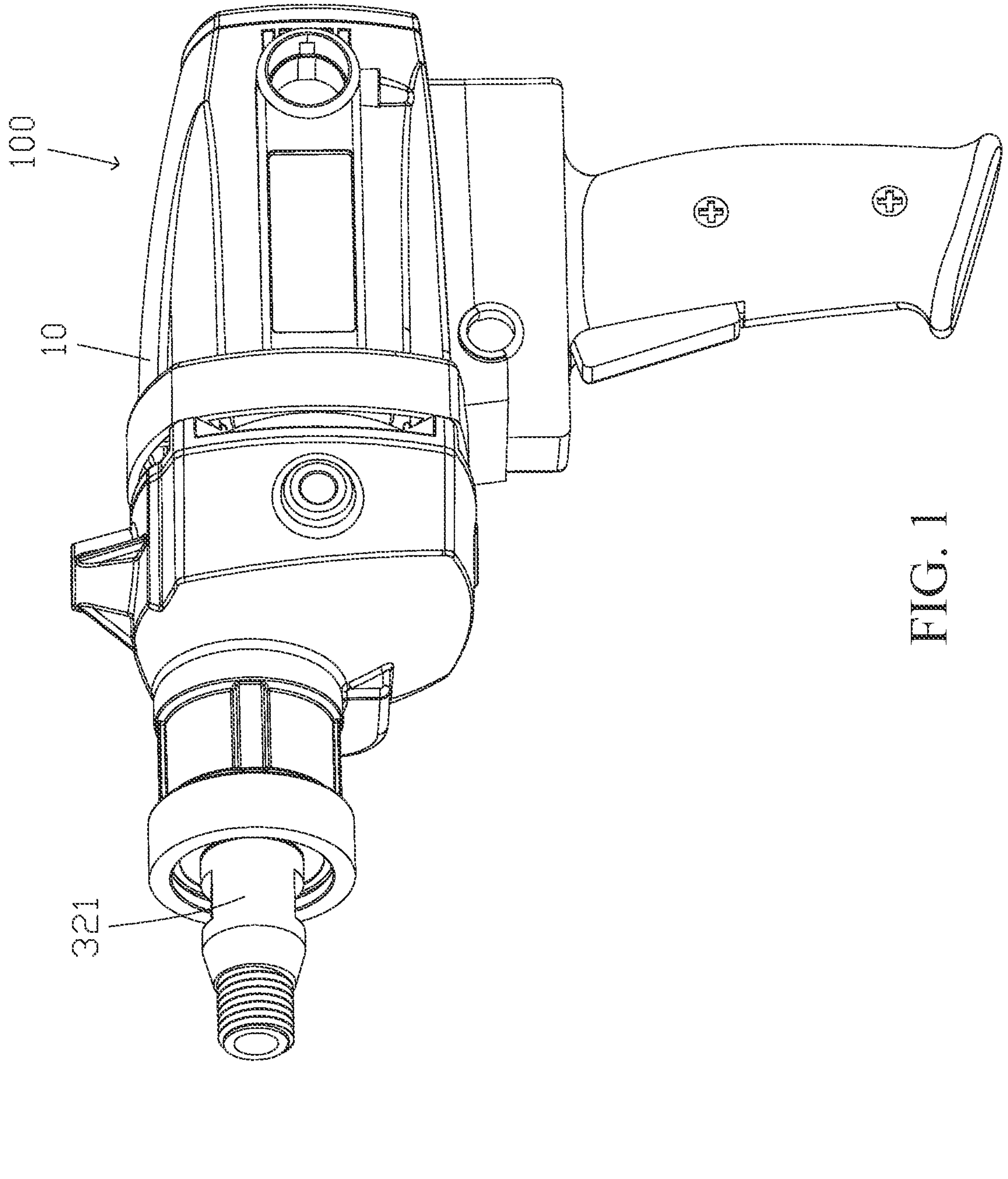
FIG. 1 is a perspective view of a power tool of the present disclosure.
Figure 2:
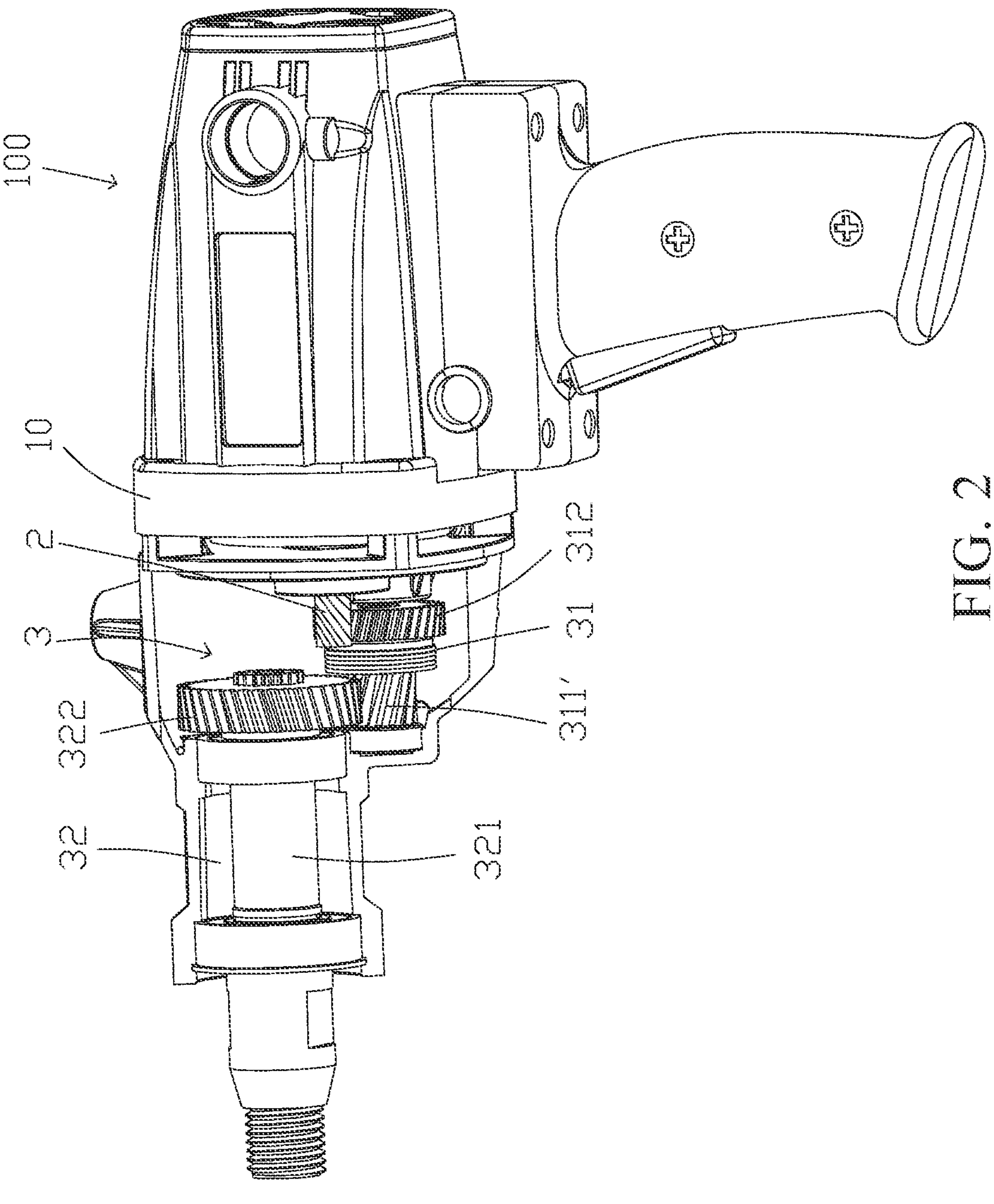
FIG. 2 is a partial cross-sectional view of the power tool of FIG. 1.
Figure 3:
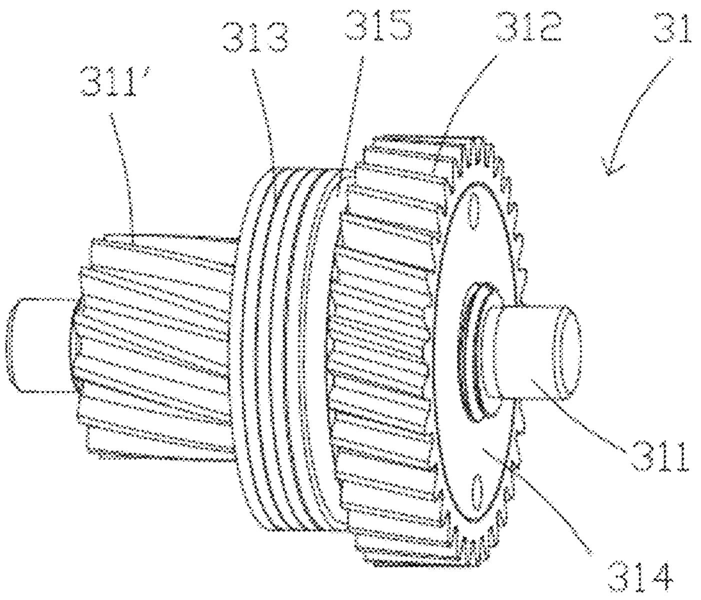
FIG. 3 is a perspective view of a clutch assembly of the power tool of FIG. 2.

Reference will now be made in detail to the embodiments of the present disclosure.

Referring to FIGS. 1-4, a power tool 100 is described in detail by taking an electric drill as an example. The power tool 100 includes a housing 10 extending along a front to rear direction, a motor 2 retained in the housing 10, and a transmission assembly 3 driven by the motor 2; the transmission assembly 3 includes a clutch assembly 31 with an overload clutch mode and an output assembly 32 connected to the clutch assembly 31. When the power tool 100 works normally, the motor 2 drives the clutch assembly 31 and the output assembly 32 for rotary output; when the transmission assembly 3 is in the overload clutch mode, the output assembly 32 is clamped by an external force and cannot be rotated for output, and the clutch assembly 31 separates the transmission of the motor 2 from the output assembly 32.

Figure 4:
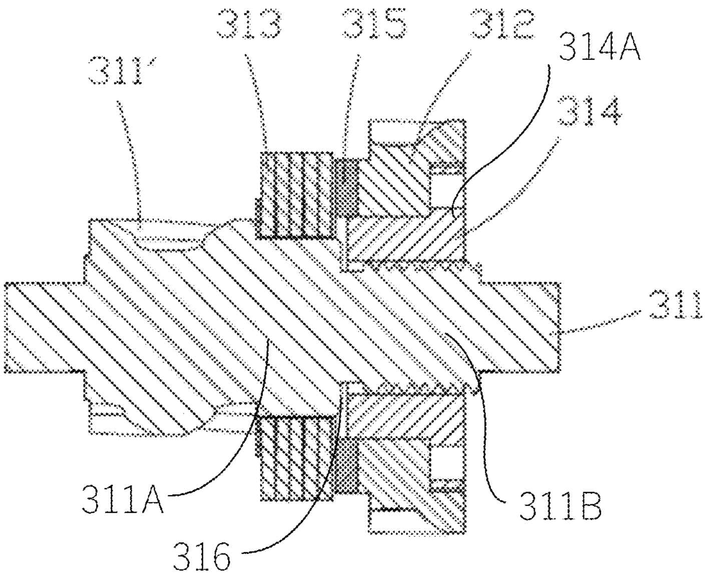
FIG. 4 is a cross-sectional view of the clutch assembly of FIG. 3.

The clutch assembly 31 includes an intermediate shaft 311 located in the housing 10, and an elastic member 313 and a clutch block that are sleeved on a periphery of the intermediate shaft 311. The clutch block includes a gear 312, a nut 314, and a friction plate 315. The elastic member 313 is composed of several elastic pieces formed by stamping and sleeved on the intermediate shaft 311. In some embodiments, the intermediate shaft 311 includes a first step portion 311A and a second step portion 311B. The elastic member 313 is sleeved on the first step portion 311A of the intermediate shaft 311 and the clutch block is sleeved on the second step portion 311B of the intermediate shaft 311. An outer diameter of the first step portion 311A is greater than an outer diameter of the second step portion 311B. The output direction of the power tool 100 is defined as the front direction, a front end of the elastic member 313 abuts against the intermediate shaft 311, and a rear end of the elastic member 313 abuts against the friction plate 315. The friction plate 315 is located between the elastic member 313 and the gear 312, a rear end of the nut 314 is supported on a rear side of the gear 312, and a front end of the nut 314 passes through the gear 312 and is clamped on the friction plate 315. The nut 314 defines a flat position or a keyway located in the front end thereof, and the friction plate 315 is clamped on the flat position or keyway and protrudes from the front end of the nut 314, so that the friction plate 315 and the nut 314 are relatively stationary in a circumferential direction. The intermediate shaft 311 defines an external thread on the periphery thereof, and the nut 314 is threadedly connected to the intermediate shaft 311 and pushes against the friction plate 315 to compress the elastic member 313. As shown in FIG. 4, the second step portion 311B of the intermediate shaft 311 corresponds to the external thread to which the nut 314 is threadedly connected. The nut 314 defines a step part 314A that protrudes radially outwardly from the rear end thereof, and the step part 314A pushes the gear 312 toward the elastic member 313. The gear 312 defines a receiving groove which is recessed inward from a rear surface thereof. The step part 314A is received in the receiving groove and abuts against an inner wall surface of the receiving groove so as to push the gear 312 toward the elastic member 313. The step part 314A of the nut 314 is received in the receiving groove and does not protrude from the rear surface of the gear 312, which is conducive to shortening the overall length of the clutch assembly 31 and miniaturizing the power tool 100.

The motor 2 is arranged with a motor shaft extending in the front to rear direction, and a front end of the motor shaft is engaged with the gear 312. The output assembly 32 includes an output shaft 321 extending forward from the housing 10 and a large gear 322 fixed at the rear end of the output shaft 321, and the intermediate shaft 311 includes an intermediate shaft gear 311' integrally formed at the front end thereof. The intermediate shaft gear 311' is engaged with the large gear 322, and rotation axes of the output shaft 321, the intermediate shaft 311, and the motor shaft are parallel to each other.

When the transmission assembly 3 is in a non-overloaded clutch mode, that is, when the power tool 100 works normally, the motor 2 is in transmitted connection with the gear 312. As the gear 312 is pressed by the elastic member 313, the gear 312 generates static friction with the friction plate 315 and the step part 314A of the nut 314 respectively, so as to drive the nut 314 to rotate together, so that the nut 314 drives the intermediate shaft 311 to rotate together, and the intermediate shaft gear 311' of the intermediate shaft 311 drives the output shaft 321 to rotate together.

When the transmission assembly 3 is in the overload clutch mode, the output shaft 321 is clamped by an external force and cannot rotate, and the large gear 322 fixedly connected with the output shaft 321 and the intermediate shaft gear 311' engaged with the large gear 322 also cannot rotate. In this case, the nut 314 screwed on the intermediate shaft 311 cannot rotate, and the driving force of the motor 2 driving the gear 312 is greater than the static friction force generated by the gear 312 with the friction plate 315 and the step part 314A of the nut 314. Then, the gear 312 rotates relative to the friction plate 315 and the step part 314A of the nut 314 and generates sliding friction, and only the motor 2 drives the gear 312 to rotate together to prevent the motor 2 from burning out due to overload.

The rear end of the nut 314 defines multiple fixing holes which are recessed forward from the rear end thereof. The nut 314 defines two fixing holes in this embodiment. During the installation of the clutch assembly 31, the operator inserts a tool into the two fixing holes respectively and tightens the nut 314 on the intermediate shaft 311. Thus, changing the tightening degree can change the maximum static friction force generated by the gear 312 with the friction plate 315 and the step part 314A of the nut 314, thereby adjusting the critical torque value of the overload clutch of the transmission assembly 3.

The intermediate shaft 311 is arranged with a stop portion 316 located in the front end of the external thread. When the power tool 100 is completely installed, the nut 314 runs through the gear 312 along the front to rear direction and is spaced with the stop portion 316, that is, a certain distance between the two is maintained. The output rotation direction of the intermediate shaft 311 is consistent with the tightening rotation direction of the nut 314. When the gear 312, the friction plate 315, and the step part 314A of the nut 314 are not worn, although the gear 312 continuously tightens the nut 314 by static friction force or sliding friction force, the nut 314 can no longer be tightened in the tightening direction because of the enough thrust the of elastic member 313 on the gear 312. After the power tool 100 works under load for a long time, the gear 312, the friction plate 315, and the step part 314A of the nut 314 are worn, the thrust of the elastic member 313 against the gear 312 is reduced, the gear 312 tightens the nut 314 by static friction force or sliding friction force, and nut 314 cannot be rotated and tightened when the thrust of the elastic member 313 against the gear 312 is large enough.

The rear end of the nut 314 of the power tool 100 is supported on the rear side of the gear 312, and the front end of the nut 314 passes through the gear 312 and is clamped on the friction plate 315, which not only ensures that the nut 314 has a stable thread engagement length with the intermediate shaft 311, but also shortens the overall length of the clutch assembly 31, which is conducive to the miniaturization of the power tool 100. In addition, the gear 312 is clamped between the friction plate 315 and the nut 314, which is conducive to improving the convenience of assembly. The nut 314 is threadedly connected to the intermediate shaft 311 and pushes against the gear 312 to compress the elastic member 313. The output rotation direction of the intermediate shaft 311 is consistent with the fastening rotation direction of the nut 314. When the gear 312 is worn with the friction plate 315 and the step part 314A of the nut 314, the gear 312 can tighten the nut 314 by friction force, thereby automatically compensating the wear of the clutch assembly 31, which solves the problem that the pressure of the elastic member 313 is weakened after the components are worn. In addition, the friction plate 315 is arranged between the elastic member 313 and the gear 312 and sleeved at the end of the nut 314 in a circumferential stationary manner. The step part 314A of the nut 314 and the friction plate 315 can simultaneously transfer the friction force transmitted by the gear 312 to the nut 314, increasing the fastening force transmitted by the gear 312 to the nut 314.

Although the present disclosure has been described with reference to particular embodiments, it is not to be construed as being limited thereto. Various alterations and modifications can be made to the embodiments without in any way departing from the scope or spirit of the present disclosure as defined in the appended claims.

What is claimed is:

1. A power tool, comprising:

a housing, extending along a front-to-rear direction;

a motor, retained in the housing; and a transmission assembly, configured to be driven by the motor and comprising a clutch assembly disposed in the housing;

wherein the clutch assembly comprises an intermediate shaft extending along the front-to- rear direction, and an elastic member and a clutch block that are sleeved on the intermediate shaft;

wherein a front end of the elastic member abuts against the intermediate shaft, and a rear end of the elastic member abuts against the clutch block;

wherein the clutch block comprises:

a gear, configured to be driven by the motor;

a friction plate, disposed between the elastic member and the gear; and a nut, threadedly connected to the intermediate shaft;

wherein a rear end of the nut is supported on a rear side of the gear, and a front end of the nut passes through the gear and is clamped by the friction plate; the friction plate and the gear are sleeved on an outer periphery of the nut, and the nut is configured to cause the friction plate to squeeze the elastic member; the elastic member is caused to push the friction plate and the gear against a step part of the nut, and the motor is configured to drive the gear to rotate synchronously with the intermediate shaft through the nut;

wherein a thread fastening direction of the nut is the same as an output rotation direction of the intermediate shaft; the intermediate shaft defines an external thread matched with the nut and a stop portion disposed at a front end of the external thread, and the front end of the nut is spaced from the stop portion;

wherein the step part of the nut protrudes radially outwardly from the rear end of the nut, and the step part pushes the gear toward the elastic member.

2. The power tool as claimed in claim 1, wherein the gear defines a receiving groove recessed inwards from a rear surface of the gear, and a rear end of the nut is accommodated in the receiving groove and abuts against an inner wall surface of the receiving groove.

3. The power tool as claimed in claim 1, wherein the nut defines a flat position or a key groove disposed in the front end of the nut, and the friction plate is clamped on the flat position or the key groove so as to enable the friction plate and the nut to be relatively static in a circumferential direction.

4. The power tool as claimed in claim 1, wherein the nut defines a plurality of fixing holes recessed forwards from a rear end of the nut.

5. The power tool as claimed in claim 1, wherein the elastic member is composed of a plurality of elastic pieces formed by stamping and sleeved on the intermediate shaft.

6. The power tool as claimed in claim 1, wherein the motor is arranged with a motor shaft extending along the front-to-rear direction, and a front end of the motor shaft is meshed with the gear.

7. The power tool as claimed in claim 6, wherein the transmission assembly comprises an output assembly connected with the clutch assembly, and the output assembly is arranged with an output shaft extending out of the housing forwards and a large gear fixed to a rear end of the output shaft; rotation axes of the output shaft and the motor shaft are parallel to each other.

8. The power tool as claimed in claim 6, wherein the intermediate shaft comprises an intermediate shaft gear integrally formed at a front end of the intermediate shaft;

the intermediate shaft gear is engaged with the large gear and is configured to rotate together with the output shaft.

9. The power tool as claimed in claim 1, wherein the gear defines a receiving groove recessed inwards from a rear surface of the gear; the step part is received in the receiving groove and abuts against an inner wall surface of the receiving groove so as to push the gear toward the elastic member.

10. A clutch assembly, comprising:

an intermediate shaft; and an elastic member and a clutch block, sleeved on the intermediate shaft; wherein a front end of the elastic member abuts against the intermediate shaft, and a rear end of the elastic member abuts against the clutch block;

wherein the clutch block comprises:

a gear, configured to be driven by a motor;

a friction plate, disposed between the elastic member and the gear; and a nut, threadedly connected to the intermediate shaft;

wherein a rear end of the nut is supported on a rear side of the gear, and a front end of the nut passes through the gear and is clamped by the friction plate; the friction plate and the gear are sleeved on an outer periphery of the nut, and the nut is configured to cause the friction plate to squeeze the elastic member; the elastic member is caused to push the friction plate and the gear against a step part of the nut, and the motor is configured to drive the gear to rotate synchronously with the intermediate shaft through the nut;

wherein a thread fastening direction of the nut is the same as an output rotation direction of the intermediate shaft; the intermediate shaft defines an external thread matched with the nut and a stop portion disposed at a front end of the external thread, the front end of the nut is spaced from the stop portion;

wherein the step part of the nut protrudes radially outwardly from the rear end of the nut, and the step part pushes the gear toward the elastic member.

11. The power tool as claimed in claim 1, wherein a spacing between the front end of the nut and the stop portion is changeable during use.

* * * * *